United States Patent
Hou et al.

(10) Patent No.: US 11,126,252 B2
(45) Date of Patent: Sep. 21, 2021

(54) COMPUTER SYSTEM AND POWER MANAGEMENT METHOD THEREOF

(71) Applicant: Acer Incorporated, New Taipei (TW)

(72) Inventors: Guan-Yu Hou, New Taipei (TW); Tz-Yu Fu, New Taipei (TW)

(73) Assignee: Acer Incorporated, New Taipei (TW)

( * ) Notice: Subject to any disclaimer, the term of this patent is extended or adjusted under 35 U.S.C. 154(b) by 22 days.

(21) Appl. No.: 16/698,985

(22) Filed: Nov. 28, 2019

(65) Prior Publication Data

US 2021/0081025 A1 Mar. 18, 2021

(30) Foreign Application Priority Data

Sep. 12, 2019 (TW) ................. 108133131

(51) Int. Cl.
*G06F 1/3234* (2019.01)
*G06F 1/3228* (2019.01)
*G06F 1/3203* (2019.01)
*G06F 1/3225* (2019.01)
*G06F 3/06* (2006.01)
*G06F 1/32* (2019.01)
*G06F 1/3215* (2019.01)

(52) U.S. Cl.
CPC .......... *G06F 1/3275* (2013.01); *G06F 1/3228* (2013.01); *G06F 1/32* (2013.01); *G06F 1/3203* (2013.01); *G06F 1/3215* (2013.01); *G06F 1/3225* (2013.01); *G06F 3/0625* (2013.01); *G06F 3/0653* (2013.01); *Y02D 10/00* (2018.01)

(58) Field of Classification Search
CPC ........ G06F 1/3203; G06F 1/32; G06F 1/3215; G06F 1/3225; G06F 1/3275; G06F 3/0625; G06F 3/0653; Y02D 10/00
See application file for complete search history.

(56) References Cited

U.S. PATENT DOCUMENTS

| | | | | |
|---|---|---|---|---|
| 2003/0196127 A1* | 10/2003 | Olsen | ..................... | G06F 1/3203 713/300 |
| 2008/0168219 A1* | 7/2008 | Molaro | ............... | G06F 11/1435 711/112 |
| 2008/0184050 A1* | 7/2008 | Yamaji | .................. | G06F 9/4418 713/323 |
| 2019/0227725 A1* | 7/2019 | Afriat | ...................... | G06F 1/32 |

\* cited by examiner

*Primary Examiner* — Terrell S Johnson
(74) *Attorney, Agent, or Firm* — JCIPRNET

(57) ABSTRACT

A computer system and a power management method thereof are provided. The computer system includes a storage apparatus and a processor. The processor is coupled to the storage apparatus. The processor obtains a state transition time of the storage apparatus. The state transition time is the time the storage apparatus takes to enter a power state and leave the power state. The processor changes a transition tolerance time according to the state transition time. In response to an idle timeout, the processor determines whether the storage apparatus enters the power state according to a comparison result between the transition tolerance time and the state transition time. Accordingly, power consumption and performance are improved.

15 Claims, 4 Drawing Sheets

Obtain a state transition time of a storage apparatus — S310

Change a transition tolerance time according to the state transition time — S330

COMPUTER SYSTEM AND POWER MANAGEMENT METHOD THEREOF

CROSS-REFERENCE TO RELATED APPLICATION

This application claims the priority benefit of Taiwan application serial no. 108133131, filed on Sep. 12, 2019. The entirety of the above-mentioned patent application is hereby incorporated by reference herein and made a part of this specification.

BACKGROUND

Technical Field

The disclosure relates to a storage apparatus management technique, and more particularly to a computer system and a power management method thereof for a storage apparatus.

Related Art

Originally in a Microsoft system, due to security considerations, a Non-Volatile Memory Express (NVMe) storage apparatus is not allowed to support an NVMe function called autonomous power state transitions (APST). Hence, Microsoft Standard NVM Express Driver (StorNVM/StorNVMe) has its own power management rules. Conceptually, the power management rules of StorNVM are similar to those of APST. In the case of adopting the power management rules of APST, when a command is issued from a system end to a driver to order an NVMe storage apparatus to enter Power State 3 (PS3) (light sleep) or Power State 4 (PS4) (deep sleep), firmware in the apparatus executes the command upon receiving the same. However, since StorNVM does not support APST, it has a set of power management rules similar to those of APST. Under this set of power management rules, a user cannot issue a command from a system end to force an apparatus to directly enter a sleep stage, and the apparatus can only enter the sleep mode after an idle timeout.

FIG. 1A and FIG. 1B illustrate a power management mechanism of StorNVM. Referring first to FIG. 1A, StorNVM originally has a sleep mechanism including only one stage. That is, only a single sleep stage is allowed in a single system in a single power state. For example, in either an alternating current (AC) mode or a direct current (DC) mode, it is possible to enter only one of PS3 and PS4. As shown in FIG. 1A, a storage apparatus in an operation mode enters PS4 in response to an idle timeout. Referring to FIG. 1B, after Windows Redstone 4 (RS4), StorNVM starts to allow two-stage sleep. That is, a single system in a single state may have two timeout mechanisms respectively for entering two different sleep stages. As shown in FIG. 1B, a storage apparatus in PS3 enters PS4 in response to an idle timeout.

In this power management mechanism, Microsoft currently only permits manufacturers to adjust parameters as appropriate at their end, and users basically cannot change the parameters after a product leaves the factory. Thus, it is important for the manufacturers to set and select suitable power management rules for a product or an apparatus. Power management not only directly affects the overall power consumption of a system end and a device end but also indirectly affects the performance of the device end. Although StorNVM is designed under a concept quite close to that of APST, there are still limitations in its use and it is not as flexible as APST. The same system settings are not necessarily suitable for all NVMe storage apparatuses, thus making it difficult for a manufacturer managing multiple parts to design a common power management mechanism for all the parts.

SUMMARY

Embodiments of the disclosure provide a computer system and a power management method thereof, in which a transition tolerance time is adjusted to enable a storage apparatus to enter a sleep state.

The power management method according to the embodiments of the disclosure is adapted for a computer system, the computer system including a storage apparatus. The power management method includes the following. A state transition time of the storage apparatus is obtained. The state transition time is the time the storage apparatus takes to enter a power state and leave the power state. A transition tolerance time is changed according to the state transition time. In response to an idle timeout, whether the storage apparatus enters the power state is determined according to a comparison result between the transition tolerance time and the state transition time of the power state.

The computer system according to the embodiments of the disclosure includes a storage apparatus and a processor. The processor is coupled to the storage apparatus and is configured to perform the following. The processor obtains a state transition time of the storage apparatus. The state transition time is the time the storage apparatus takes to enter a power state and leave the power state. The processor changes a transition tolerance time according to the state transition time. In response to an idle timeout, the processor determines whether the storage apparatus enters the power state according to a comparison result between the transition tolerance time and the state transition time of the power state.

Based on the above, in the computer system and the power management method thereof according to the embodiments of the disclosure, the transition tolerance time is adjusted based on the time (i.e., state transition time) the storage apparatus takes to transition to a power state. The storage apparatus is allowed to enter a predetermined power state only when the transition tolerance time is greater than the state transition time. Therefore, by adjusting the transition tolerance time, the storage apparatus can be switched to an appropriate power state, thereby improving system power consumption and apparatus performance.

To make the above features and advantages of the disclosure more comprehensible, examples accompanied with drawings are described in detail as follows.

DESCRIPTION OF THE EMBODIMENTS

Figure 1A:
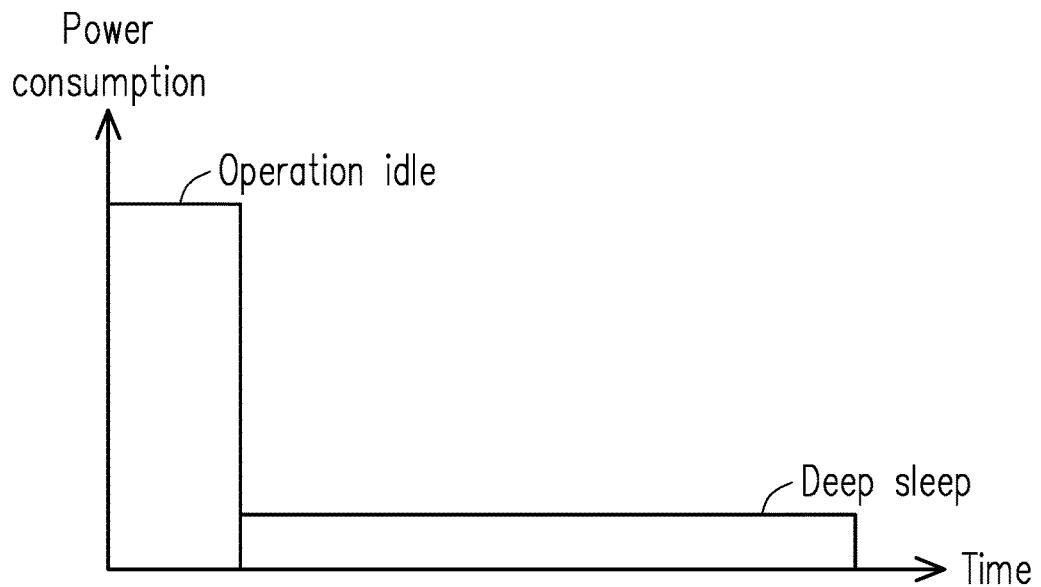
FIG. 1A and FIG. 1B illustrate a power management mechanism of StorNVM.
Figure 1B:
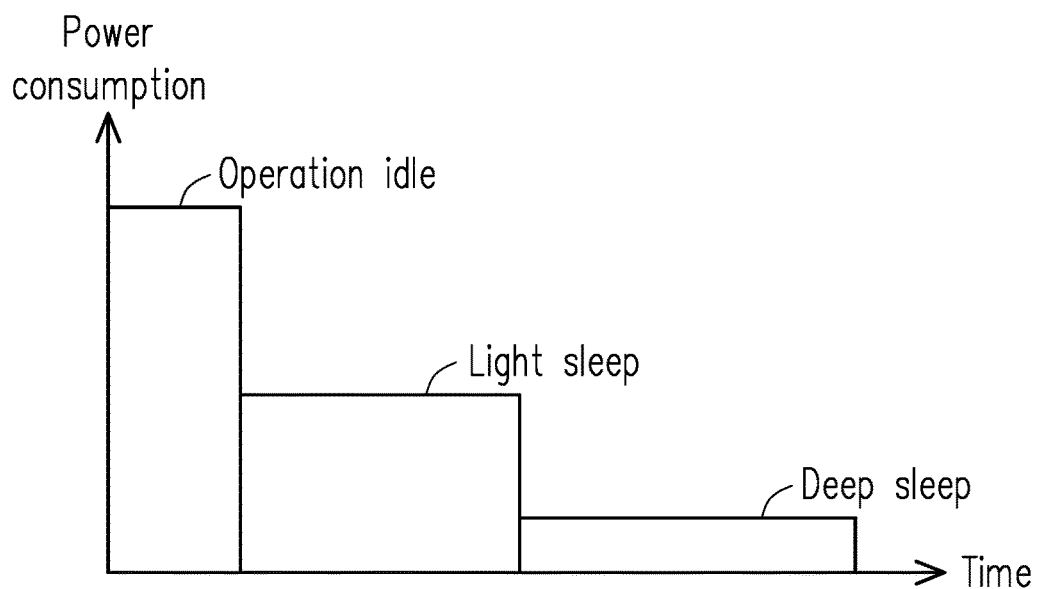
Figure 2A:
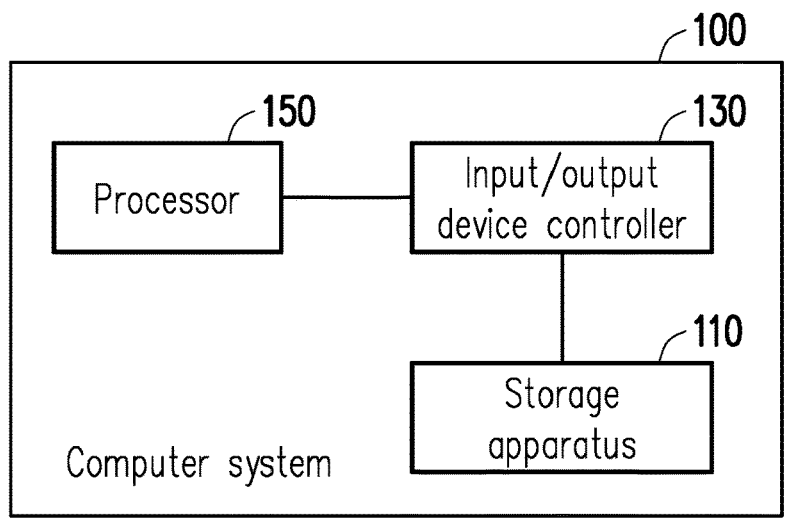
FIG. 2A is a block diagram of components of a computer system according to one embodiment of the disclosure.

FIG. 2A is a block diagram of components of a computer system 100 according to one embodiment of the disclosure. The computer system 100 includes, but not limited to, one or more storage apparatuses 110, an input/output device controller 130, and a processor 150. The computer system 100 may be an electronic apparatus, such as a desktop computer, a notebook computer, a server, an all-in-one (MO) or the like.

The storage apparatus 110 may be a solid-state disk (SSD) having any type of non-volatile memory (e.g., a memory having non-volatile storage characteristics, such as a NAND flash, a storage class memory (SCM), a persistent memory, a 3D Xpoint memory, a magnetoresistive random access memory (MRAM), etc.). In the embodiments of the disclosure, the storage apparatus 110 is based on the Non-Volatile Memory Express (NVMe) specification. However, in other embodiments, the storage apparatus 110 may have a transmission interface based on another specification, which may be changed by the developer.

The input/output device controller 130 is coupled to the storage apparatus 110. The input/output device controller 130 may be a platform controller hub (PCH), an input/output (I/O) controller hub (ICH) or the like, configured to manage a bus interface, a network interface, a storage interface or other peripheral device interface.

The processor 150 is coupled to the input/output device controller 130. The processor 150 may be a central processing unit (CPU), or a programmable general purpose or special purpose microprocessor, a digital signal processor (DSP), a programmable controller, an application-specific integrated circuit (ASIC) or other similar component or a combination of the foregoing. In the embodiments of the disclosure, the processor 150 is configured to execute all the operations of the computer system 100, and may load and execute operating systems, software modules, drivers, files and data stored in the storage apparatus 110.

Figure 2B:
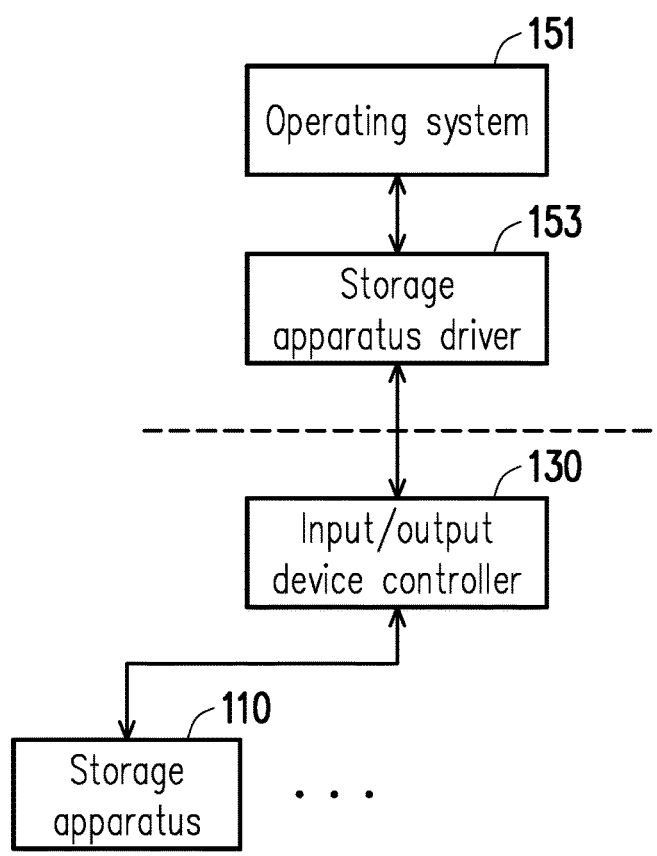
FIG. 2B illustrates a hardware and software architecture of a computer system according to one embodiment of the disclosure.

FIG. 2B illustrates a hardware and software architecture of the computer system 100 according to one embodiment of the disclosure. Referring to FIG. 2B, the processor 150 runs an operating system 151 and a storage apparatus driver 153. In one embodiment, the operating system 151 is a Microsoft Windows system and the storage apparatus driver 153 is StorNVM. The operating system 151 runs a system program or application program and issues a command (e.g., a power state switch command or a parameter setting command) to the storage apparatus driver 153, thereby controlling or setting the power of the storage apparatus 110 through the input/output device controller 130. It is to be noted that, in other embodiments, the types of the operating system 151 and the storage apparatus driver 153 may vary.

To facilitate understanding of an operation process in the embodiments of the disclosure, an operation flow of the computer system 100 with respect to power management in the disclosure will be described in detail below through embodiments. In the following, a method in the embodiments of the disclosure will be described with reference to the components and modules of the computer system 100. The steps in this method may be varied according to actual situations and are not limited to those described herein.

Figure 3:
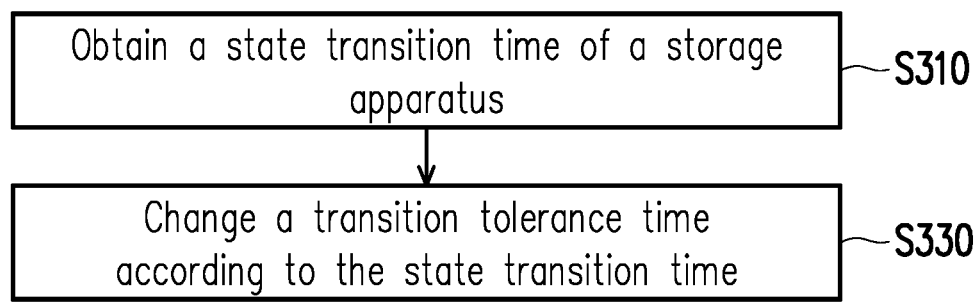
FIG. 3 is a flowchart of a power management method according to one embodiment of the disclosure.

FIG. 3 is a flowchart of a power management method according to one embodiment of the disclosure. Referring to FIG. 3, the processor 150 obtains a state transition time of the storage apparatus 110 (step S310). Specifically, the state transition time is the time the storage apparatus 110 takes to enter a power state and leave the power state. In Microsoft's StorNVM system, if the storage apparatus 110 is to enter a power state after an idle timeout, a setting item (defined herein as transition tolerance time, e.g., NVMe power state latency tolerance among the power options of a Windows system) of the power state must be greater than the time (NVMe idle tolerance, i.e., the state transition time defined herein) the storage apparatus 110 takes to enter and leave the power state. In other words, in response to the idle timeout of the storage apparatus 110, the storage apparatus driver 153 determines whether the storage apparatus 110 enters the power state according to a comparison result between the transition tolerance time and the state transition time of the power state. If the comparison result indicates that the transition tolerance time is greater than the state transition time of the power state, the storage apparatus driver 153 controls the storage apparatus 110 to enter the power state. If the comparison result indicates that the transition tolerance time is not greater than the state transition time of the power state, the storage apparatus driver 153 disables the storage apparatus 110 or controls the storage apparatus 110 to not enter the power state (i.e., to maintain the current power state).

The operating system 151 queries the storage apparatus 110 through the storage apparatus driver 153 for the state transition time in each power state. For example, a command prompt is used to order PowerShell to issue a state transition time query command. Firmware of the storage apparatus 110 provides an answer about its state transition time. In one embodiment, the storage apparatus 110 may provide an answer about a latency time in entering a power state and a latency time in leaving the power state, and the processor 150 then uses the sum of these two latency times as the state transition time of the power state. In addition, the embodiments of the disclosure are directed to the state transition time of a power state in a sleep mode, a low power mode or a dormant mode (e.g., PS3, PS4 or the like whose (maximum) power consumption is lower than a normal mode).

Next, the processor 150 changes the transition tolerance time according to the state transition time (step S330). Specifically, a comparison result between the transition tolerance time and the state transition time affects whether to switch the power state of the storage apparatus 110. Table (1) shows an example of power management settings. If a storage apparatus No. 1 is to enter PS3, the transition tolerance time must be set greater than 2 milliseconds (ms); if it is to enter PS4, the transition tolerance time must be set greater than 6 ms. However, the same transition tolerance time is not necessarily suitable for all the storage apparatuses. It is assumed that the transition tolerance time in an alternating current (AC) mode (using a general power supply) is 5 ms, and the transition tolerance time in a direct current (DC) mode (using a battery) is 15 ms. Based on the above settings, in a computer system in the AC mode, storage apparatuses Nos. 3 and 5 cannot enter the sleep mode (e.g., PS3 or PS4), while the other storage apparatuses are surely able to enter at least PS3. In contrast, in the DC mode, setting a single transition tolerance time cannot enable different storage apparatuses to enter the same power state/sleep mode.

TABLE (1)

| Apparatus No. | Latency/state transition time of PS3 | Latency/state transition time of PS4 | AC mode | DC mode |
| --- | --- | --- | --- | --- |
| 1 | 2 ms | 6 ms | PS3 | PS4 |
| 2 | 4 ms | 7 ms | PS3 | PS4 |

TABLE (1)-continued

| Apparatus No. | Latency/state transition time of PS3 | Latency/state transition time of PS4 | AC mode | DC mode |
|---|---|---|---|---|
| 3 | 6 ms | 55 ms | No sleep | PS3 |
| 4 | 2 ms | 490 ms | PS3 | PS3 |
| 5 | 14 ms | 49 ms | No sleep | PS3 |
| 6 | 1.2 ms | 8 ms | PS3 | PS4 |

Such nonuniformity has led to problems. For example, the Energy Star program requires that a system reduce power consumption when idle to meet environmental standards. However, in the AC mode, the storage apparatuses Nos. 4 and 5 face a problem that they cannot meet environmental standards. In the DC mode, if a computer system is equipped with several different storage apparatuses at the same time, nonuniform levels of sleep may cause excessive power consumption in the storage apparatuses, and battery life specifications for a platform cannot be met.

To enable the storage apparatus 110 to enter another power state (or the sleep mode) after an idle timeout, in one embodiment, the processor 150 increases the transition tolerance time and causes the transition tolerance time to be greater than the state transition time. A numerical value by which the transition tolerance time is increased may be fixed or not, and may vary depending on a difference between the original transition tolerance time and the state transition time. The operating system 151 executes a command prompt, PowerShell, or a batch script, and sets the changed transition tolerance time for a driver (i.e., the storage apparatus driver 153) of the storage apparatus 110 through a registry command.

In one embodiment, the storage apparatus 110 includes a first power state and a second power state respectively corresponding to two sleep modes, wherein the second power state has lower (maximum) power consumption than the first power state. For example, the maximum power consumption of PS4 is generally lower than PS3. The storage apparatus driver 153 provides access for setting the transition tolerance time in the AC mode and the DC mode. For the AC mode, the processor 150 sets the transition tolerance time greater than the state transition time of the first power state. For the DC mode, the processor 150 sets the transition tolerance time greater than the state transition time of the second power state. Thereby, in response to the idle timeout of the storage apparatus 110, it is ensured that the computer system 100 enters the first power state in the AC mode and enters the second power state in the DC mode.

It is to be noted that, in other embodiments, the processor 150 may change the transition tolerance time in the DC and AC modes only for the state transition time of the first power state or only for the state transition time of the second power state, or the processor 150 may change the transition tolerance time in the DC and AC modes based on a weight ratio between the state transition times of the two power states.

In another embodiment, the computer system 100 includes another one or more storage apparatuses 110. The processor 150 compares the state transition times of these storage apparatuses 110 and changes the transition tolerance time depending on the greatest state transition time. Specifically, if the computer system 110 only allows a single transition tolerance time to be set, to enable all the storage apparatuses 110 to enter another power state after an idle timeout, the processor 150 may set the transition tolerance time greater than the greatest state transition time among these storage apparatuses 110.

For example, Tables (2) and (3) respectively show the power management settings of two storage apparatuses 110. The processor 150 queries the two storage apparatuses 110 for the state transition times (14 ms (10+4 ms) and 2 ms (1+1 ms), respectively) of a first not-in-operation state (e.g., PS3). The processor 150 determines a transition tolerance time based on the greatest state transition time (i.e., 14 ms). For example, the transition tolerance time may be set to 15 ms.

TABLE (2)

| Power state | Operation state | Maximum power | Latency time in entering | Latency time in leaving |
|---|---|---|---|---|
| PS0 | Normal | 5.5 W | None | None |
| PS1 | Normal | 3.5 W | None | None |
| PS2 | Normal | 3.0 W | None | None |
| PS3 | Not in operation | 70.0 mW | 4 ms | 10 ms |
| PS4 | Not in operation | 2.5 mW | 4 ms | 45 ms |

TABLE (3)

| Power state | Operation state | Maximum power | Latency time in entering | Latency time in leaving |
|---|---|---|---|---|
| PS0 | Normal | 7.9 W | 600 μs | 600 μs |
| PS1 | Normal | 7.9 W | 600 μs | 600 μs |
| PS2 | Normal | 7.9 W | 600 μs | 600 μs |
| PS3 | Not in operation | 100.0 mW | 1 ms | 1 ms |
| PS4 | Not in operation | 5.0 mW | 400 ms | 90 ms |

Another embodiment will be described below in order to facilitate understanding of the embodiments of the disclosure.

Figure 4:
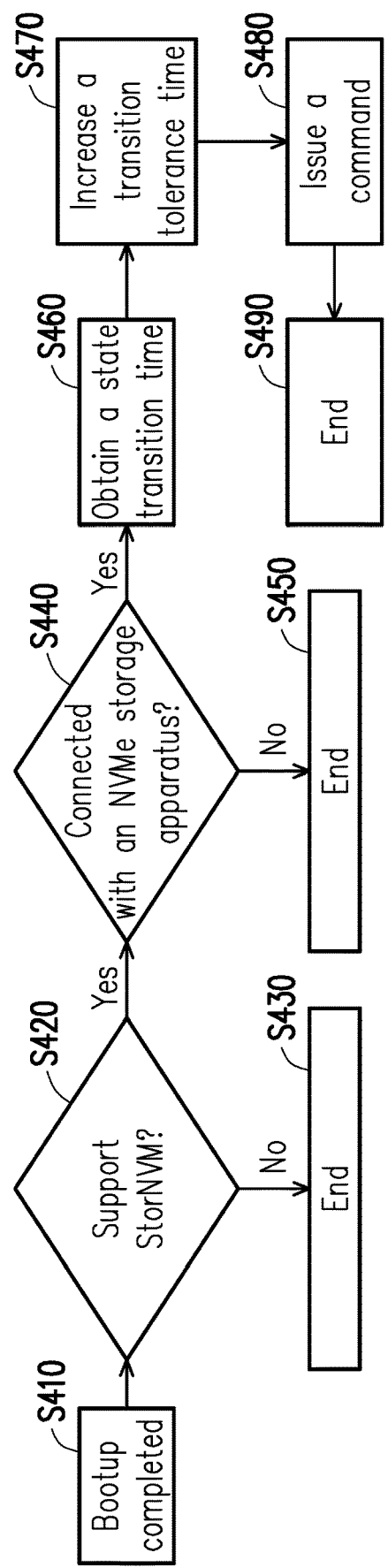
FIG. 4 is a flowchart of realizing a power management method according to one embodiment of the disclosure.

FIG. 4 is a flowchart of realizing a power management method according to one embodiment of the disclosure. Referring to FIG. 4, the embodiments of the disclosure may be implemented through a detection program, and the detection program may be preset to be activated at each bootup or in response to other conditions. After the computer system 100 is booted (step S410), the processor 150 checks whether the operating system 151 supports Microsoft's storNVM (step S420) and whether the computer system 100 has an NVMe storage apparatus (step S440) (the order of steps S420 and S440 is not limited). If NO in both steps, it means that no adjustment or setting is required for the transition tolerance time in the current environment, and the detection program may be ended (steps S430 and S450). If YES in both steps, the processor 150 starts to query and obtain the state transition time (e.g., NVMe idle tolerance) of each NVMe storage apparatus in the system (step S460), adds 1 ms (which is variable and increases the transition tolerance time) to the obtained state transition time (step S470), and issues a calculated parameter (i.e., an operation result of the state transition time plus 1 ms) to the storage apparatus driver 153 (e.g., StorNVM) through a registry command provided by Microsoft (step S480), thereby completing the current operation of the detection program (step S490), and the detection program may be closed. In this way, the power management of the storage apparatus 110 can reliably be optimized every time the system is booted. Moreover, since the detection program is closed immediately after a task is executed, no burden will be placed on the system.

Table (4) shows a simulation result of power consumption and performance. By switching to a correct power state, the system not only ensures a balance in power consumption but is also significantly improved in performance.

TABLE (4)

| Power policy No. | First timeout | Second timeout | Performance (compared to full-time normal operation mode) | | Power consumption | |
|---|---|---|---|---|---|---|
| | | | PCMark Vantage | PCMark 8 | Average | Comparison |
| 1 | 100 ms (PS4) | None | 53% | 49% | 177 mW | |
| 2 | 100 ms (PS3) | None | 95% | 73% | 155 mW | −12% |
| 3 | 100 ms (PS3) | 1 s (PS4) | 91% | 71% | 181 mW | 2.26% |
| 4 | 100 ms (PS3) | 3 s (PS4) | 91% | 73% | 151 mW | −14.8% |

In summary, in the computer system and the power management method thereof according to the embodiments of the disclosure, the transition tolerance time as a reference for determining whether to switch a power state is changed to be greater than the latency time of the storage apparatus in entering and leaving a power state, such that the storage apparatus after an idle timeout can enter another sleep mode, low power mode or dormant mode, thereby improving the power consumption and maintaining good performance.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. A power management method adapted for a computer system, wherein the computer system comprises a storage apparatus, the power management method comprising:
    obtaining a state transition time and a second state transition time of the storage apparatus, wherein the state transition time is a time the storage apparatus takes to enter a power state and leave the power state, the second state transition time is a time the storage apparatus takes to enter a second power state and leave the second power state, and the second power state has lower power consumption than the power state; and
    changing a transition tolerance time according to the state transition time, wherein
        in response to an idle timeout, whether the storage apparatus enters the power state is determined according to a comparison result between the transition tolerance time and the state transition time of the power state;
        setting the transition tolerance time for a direct current (DC) mode of the computer system by using a time larger than the second state transition time; and
        setting the transition tolerance time for an alternating current (AC) mode of the computer system by using another time larger than the first state transition time.

2. The power management method according to claim 1, wherein changing the transition tolerance time according to the state transition time comprises:
    increasing the transition tolerance time such that the transition tolerance time is greater than the state transition time.

3. The power management method according to claim 1, wherein changing the transition tolerance time according to the state transition time comprises:
    setting the changed transition tolerance time for a driver of the storage apparatus through a registry command.

4. The power management method according to claim 1, wherein the computer system further comprises a second storage apparatus, and changing the transition tolerance time according to the state transition time comprises:
    comparing the state transition time of the storage apparatus with the state transition time of the second storage apparatus; and
    changing the transition tolerance according to the greatest state transition time.

5. The power management method according to claim 1, wherein changing the transition tolerance time according to the state transition time comprises:
    increasing the transition tolerance time for the DC mode of the computer system according to the second state transition time; and
    increasing the transition tolerance time for the AC mode of the computer system according to the state transition time.

6. The power management method according to claim 1, wherein the storage apparatus is based on the Non-Volatile Memory Express (NVMe) specification, and a driver for controlling the storage apparatus is StorNVM.

7. The power management method according to claim 1, wherein changing the transition tolerance time according to the state transition time comprises:
    determining whether the storage apparatus is based on the NVMe specification or an operating system (OS) of the computer system supports the StorNVM; and
    not changing the transition tolerance time in response to the storage apparatus being not based on the NVMe specification or the OS not supporting the StorNVM.

8. A computer system comprising:
    a storage apparatus; and
    a processor coupled to the storage apparatus and configured to:
        obtain a state transition time and a second state transition time of the storage apparatus, wherein the state transition time is a time the storage apparatus takes to enter a power state and leave the power state, the second state transition time is a time the storage apparatus takes to enter a second power state and leave the second power state, and the second power state has lower power consumption than the power state; and
        change a transition tolerance time according to the state transition time, wherein
            in response to an idle timeout, whether the storage apparatus enters the power state is determined according to a comparison result between the transition tolerance time and the state transition time of the power state;

setting the transition tolerance time for a direct current (DC) mode of the computer system by using a time larger than the second state transition time; and setting the transition tolerance time for an alternating current (AC) mode of the computer system by using another time larger than the first state transition time.

9. The computer system according to claim 8, wherein the processor is configured to:

increase the transition tolerance time such that the transition tolerance time is greater than the state transition time.

10. The computer system according to claim 8, wherein the processor is configured to:

set the changed transition tolerance time for a driver of the storage apparatus through a registry command.

11. The computer system according to claim 8, further comprising:

a second storage apparatus coupled to the processor, wherein the processor is configured to:

compare the state transition time of the storage apparatus with the state transition time of the second storage apparatus; and change the transition tolerance according to the greatest state transition time.

12. The computer system according to 8, wherein the processor is configured to:

increase the transition tolerance time for the DC mode of the computer system according to the second state transition time; and increase the transition tolerance time for the AC mode of the computer system according to the state transition time.

13. The computer system according to claim 8, wherein the storage apparatus is based on the Non-Volatile Memory Express (NVMe) specification, and a driver for controlling the storage apparatus is StorNVM.

14. The computer system according to claim 8, wherein the processor is configured to:

determine whether the storage apparatus is based on the NVMe specification or an operating system (OS) of the computer system supports the StorNVM; and not change the transition tolerance time in response to the storage apparatus being not based on the NVMe specification or the OS not supporting the StorNVM.

15. The computer system according to claim 8, wherein the processor is configured to:

in response to the computer system being booted, determine whether to change the transition tolerance time.

\* \* \* \* \*